(12) United States Patent
Georgieva et al.

(10) Patent No.: US 11,394,525 B2
(45) Date of Patent: Jul. 19, 2022

(54) CRYPTOGRAPHY DEVICE HAVING SECURE PROVISION OF RANDOM NUMBER SEQUENCES

(71) Applicant: THALES DIS FRANCE SA, Meudon (FR)

(72) Inventors: Mariya Georgieva, Meudon (FR); Aline Gouget, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 136 days.

(21) Appl. No.: 16/767,926

(22) PCT Filed: Nov. 30, 2018

(86) PCT No.: PCT/EP2018/083184
§ 371 (c)(1),
(2) Date: May 28, 2020

(87) PCT Pub. No.: WO2019/106166
PCT Pub. Date: Jun. 6, 2019

(65) Prior Publication Data
US 2020/0374100 A1    Nov. 26, 2020

(30) Foreign Application Priority Data
Dec. 1, 2017 (EP) .................................. 17306687

(51) Int. Cl.
*H04L 9/00* (2022.01)
*H04L 9/08* (2006.01)
(Continued)

(52) U.S. Cl.
CPC ............ *H04L 9/008* (2013.01); *H04L 9/0869* (2013.01); *H04L 9/3013* (2013.01); *H04L 9/3093* (2013.01); *H04L 2209/16* (2013.01)

(58) Field of Classification Search
CPC ..... H04L 9/008; H04L 9/0869; H04L 9/3013; H04L 9/3093; H04L 9/0668; H04L 2209/16
See application file for complete search history.

(56) References Cited

U.S. PATENT DOCUMENTS

2009/0041236 A1* 2/2009 Gligoroski .............. H04L 9/065
380/278
2013/0329883 A1* 12/2013 Tamayo-Rios .......... H04L 9/008
380/28

(Continued)

FOREIGN PATENT DOCUMENTS

| WO | WO2011/120125 A1 | 10/2011 |
| WO | WO2013116916 A1 | 8/2013 |
| WO | WO2019106139 A1 | 6/2019 |

OTHER PUBLICATIONS

QUAD: A multivariate stream cipher with provable security, Henri et al. (Year: 2009).*

(Continued)

*Primary Examiner* — Vu V Tran
(74) *Attorney, Agent, or Firm* — The Jansson Firm; Pehr B. Jansson

(57) ABSTRACT

Secure computation of a random number sequence in a cryptographic device. The computation is secured by receiving a homomorphic ciphertext seed vector, selecting an initial internal state from the seed vector, the initial internal state composed of a subset of elements of the seed vector, updating an internal state from a previous internal state using multivariate functions accepting elements of the previous internal state as inputs to produce a homomorphic ciphertext from homomorphic ciphertext input values, generating an intermediate result vector of homomorphic ciphertexts from the homomorphic ciphertext internal state multivariate functions accepting the elements of the internal (Continued)

state as inputs to produce a homomorphic ciphertext from homomorphic ciphertext input values, and decrypting the intermediate result vector elements into plaintext vector elements, thereby producing a plaintext deterministic random sequence vector corresponding to plaintext seed elements used to produce the seed vector. Other systems and methods are disclosed.

24 Claims, 9 Drawing Sheets

(51) Int. Cl.
*H04L 9/30* (2006.01)
*H04L 9/06* (2006.01)

(56) References Cited

U.S. PATENT DOCUMENTS

| | | | | |
|---|---|---|---|---|
| 2015/0215123 A1* | 7/2015 | Kipnis | ............... | H04L 9/002 380/46 |
| 2015/0358154 A1* | 12/2015 | Garcia Morchon | .... | G06F 7/586 380/28 |
| 2017/0244553 A1* | 8/2017 | Savry | ............... | G06F 21/72 |
| 2018/0139190 A1* | 5/2018 | Chaum | ............... | H04L 9/008 |
| 2019/0394039 A1* | 12/2019 | Higo | ............... | H04L 9/0643 |
| 2020/0089919 A1* | 3/2020 | Courousse | ............... | G09C 1/00 |

OTHER PUBLICATIONS

PCT/EP2018/083184, International Search Report, dated Jan. 30, 2019, European Patent Office, P.B. 5818 Patentlaan 2 NL—2280 HV Rijswijk.

PCT/EP2018/083184, Written Opinion of the International Searching Authority, dated Jan. 30, 2019, European Patent Office, D-80298 Munich, Germany.

Berbain Come et al: "QUAD: A Practical Stream Cipher with Provable Security", (May 28, 2006), Medical Image Computing and Computer-Assisted Intervention—MICCAI 2015 : 18th International Conference, Munich, Germany, Oct. 5-9, 2015; Proceedings; [Lecture Notes in Computer Science; Lect.Notes Computer], Springer International Publishing, CH, XP047422747, ISSN: 0302-9743 ISBN: 978-3-319-69952-3 section 3.

Stanley Chow et al.,White-Box Cryptography and an AES Implementation, Proceedings of the 9th International Workshop on Selected Areas in Cryptography (SAC 2002), vol. 2595 of Lecture Notes in Computer Science, pp. 250-270. Springer, 2002.

Stanley Chow et al., White-Box Cryptography DES Implementation for DRM applications, in Proceedings of the ACM Workshop on Security and Digital Rights Management (DRM 2002), vol. 2696 of Lecture Notes in Computer Science, pp. 1-15. Springer 2002.

Chillotti Ilaria et al: "Faster Packed Homomorphic Operations and Efficient Circuit Bootstrapping for TFHE", (Nov. 30, 2017), Medical Image Computing and Computer-Assisted Intervention—MICCAI 2015 : 18th International Conference, Munich, Germany, Oct. 5-9, 2015; Proceedings; [Lecture Notes in Computer Science; Lect. Notes Computer], Springer International Publishing, CH, XP047455824, ISSN: 0302-9743, ISBN: 978-3-642-38287-1 [retrieved on Nov. 30, 2017] the whole document.

Emmanuela Orsini et al.: "Bootstrapping BGV Ciphertexts With A Wider Choice of p and q", International Association for Cryptologic Research, vol. 20140930:085538, (Sep. 3, 2014), pp. 1-20, XP06107014, the whole document.

PCT/EP2018/083115, International Search Report, dated Jan. 9, 2019, European Patent Office, P.B 5818 Patentlaan 2 ML—2280 HV Rijswijk.

PCT/EP2018/083115, Written Opinion of the International Searching Authority, dated Jan. 9, 2019, European Patent Office, D-80298 Munich, Germany.

* cited by examiner

CRYPTOGRAPHY DEVICE HAVING SECURE PROVISION OF RANDOM NUMBER SEQUENCES

BACKGROUND OF THE INVENTION

The present invention generally relates to cryptography devices, and more particularly to cryptography devices that avoid manipulation of secret data, such as keys and random number generator seeds, in plaintext to thereby be more resilient to side-channel attacks including white-box attacks designed to discern such secret data.

Broadly, cryptography provides mechanisms by which a private plaintext message may be protected from being divulged by converting the message into a ciphertext that may only be deciphered, i.e., converted back into the plaintext by specific persons or entities that are privy to a secret key required for performing the deciphering operation.

Two major categories of cryptography are shared secret cryptography and private-key-public-key cryptography (herein, simply referred to as public key cryptography). The former includes the Digital Encryption Standard (DES) and the Advanced Encryption Standard (AES). The latter includes Rivest-Shamir-Adleman (RSA).

In shared secret cryptography the encrypting party and the decrypting party share a secret key (herein, the shared secret key) that is used to both encrypt and decrypt a message. In public key cryptography, the recipient of a ciphertext message, i.e., the decrypting party, has a private key or secret key required to decipher ciphertext messages encoded with the public key. In other words, there is an association between a particular private key and a particular public key; they form a key pair. The public key is made available to anyone who wishes to send an encoded message (a ciphertext message) whereas the corresponding secret key is kept secret by the intended recipient of messages.

Traditionally, cryptography relied on a message being turned into a ciphertext, that only sender and recipient would know the required keys, and that the encryption and decryption processes would not be available for a nefarious person trying to discern the secret message. Keys were protected by not giving access to the machines that were used to decrypt a text. The endpoints of a communication is trusted and the communication channel between the endpoints is protected by turning messages into ciphertext that cannot be decrypted without access to the required decryption key. This is referred to as black-box cryptography.

However, there are situations where the cryptography device has to be made available on open devices to a party that not necessarily should have access to the cryptography key. For example, in a digital rights management (DRM) scenario a publisher may wish to make a DRM protected work available to a subscriber. As long as the subscriber satisfies the terms of the subscription, the work is available. However, at the end of a subscription term, the subscriber should not have access to the work.

The open nature of these systems, which may be referred to as white-box environments—whether PCs, tablets, or smart phones—renders the cryptography software extremely vulnerable to attack because the attacker has complete control of the execution platform and of the software implementation itself. The attacker can easily analyze the binary code of the cryptography application and, for example, memory pages used for temporary storage during the execution by intercepting system calls, tampering with the binary or execution files. Such manipulation may, for example, be performed using debuggers and hardware emulation tools.

These attacks include trace execution, examination of intermediate results, and access to keys located in memory as well as performance of static analysis on the cryptography software and alteration of sub-computations for perturbation analysis.

Generally, countermeasures aimed to protect against such attacks in a white-box environment are referred to as white-box countermeasures.

If the work is protected through cryptography, the decryption key may be provided on the subscriber's cryptography device, e.g., a mobile device such as a mobile telephone, in a manner that it can be used by the device to decrypt the work without revealing either the key or the algorithm to the subscriber. The key might be hidden in some way inside the code implementing the decryption algorithm may be obfuscated so that it is very difficult to determine any information about the value of key. Cryptographic countermeasures in a white-box environment are referred to as white-box cryptography.

White-box cryptography was first described by Chow et al. in [Chow AES] Stanley Chow, et al., *White-Box Cryptography and an AES Implementation*, in *Proceedings of the $9^{th}$ International Workshop on Selected Areas in Cryptography* (SAC 2002), volume 2595 of *Lecture Notes in Computer Science*, pp. 250-270. Springer, 2002 and in [Chow DES] Stanley Chow, et al., *White-Box Cryptography DES Implementation for DRM applications*, in *Proceedings of the ACM Workshop on Security and Digital Rights Management* (DRM 2002), volume 2696 of *Lecture Notes in Computer Science*, pp. 1-15. Springer, 2002. [Chow AES] and [Chow DES] are both incorporated herein by reference in their entireties.

However, hitherto, all practical white-box cryptography approaches have been broken. Therefore, there is still an unmet need to provide cryptography devices that protect cryptographic keys from being divulged.

Random numbers are frequently used in cryptographic operations. For example, to introduce a bit more obfuscation into a calculation, the calculation may introduce a random value. Another example in which random numbers are used is ElGamal encryption. ElGamal is an example of public key encryption. To create a public key, the key generator selects a random number. Many algorithms involving random number sequences, require the sequences to be deterministic, i.e., reproducible.

Other uses of random numbers in white-box cryptography include challenge-response protocols in which the challenge is created using a random number, the generation of nonce vales in ECDSA (Elliptic Curve Digital Signature Algorithm) signatures, random number masks (in white-box countermeasures), and random padding of signatures and encrypted values.

Pseudo random number generators typically operate using a seed value. See e.g., Elaine Barker and John Kelsey, *Recommendation for Random Number Generation Using Deterministic Random Bit Generators*, NIST Special Publication 800-90A, NIST, January 2012. That seed value presents a vulnerability to the underlying cryptographic scheme.

From the foregoing it will be apparent that there is still a need for improving the security of devices that rely on white-box cryptography by providing a secure mechanism for generating deterministic pseudorandom number sequences.

DETAILED DESCRIPTION OF THE INVENTION

Figure 1:
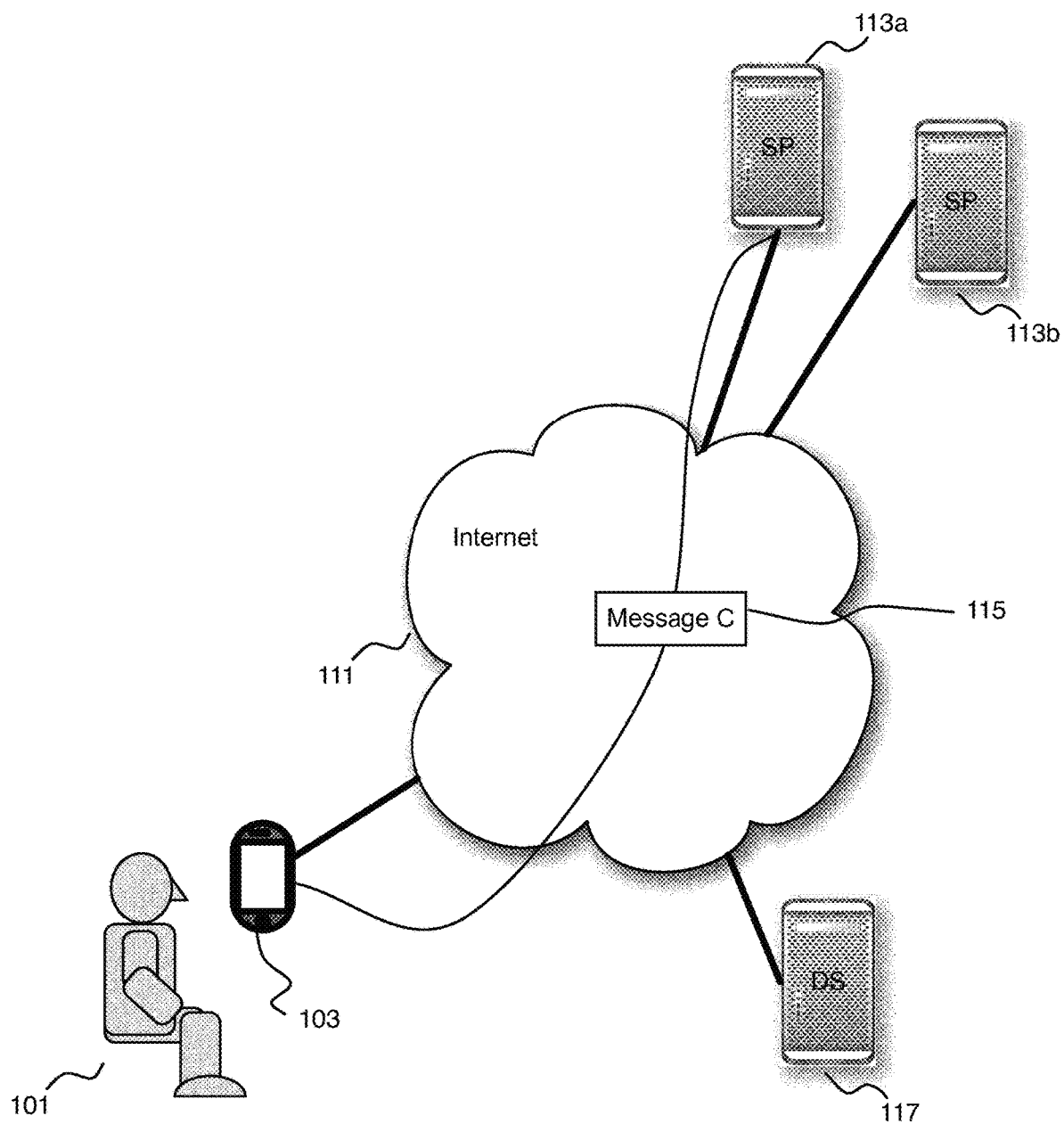
FIG. 1 is a schematic illustration of a mobile device optionally connected over a network to one or more servers from which the mobile device may obtain materials which it would perform cryptographic operations on, for example, for obtaining access to digital rights management protected content.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment of the invention, a cryptographic device, e.g., a mobile telephone, a tablet, or a personal computer executes a white-box cryptography mechanism incorporating a deterministic random number generator in which the random number generator seed value is not manipulated in plaintext on the cryptographic device.

FIG. 1 is a schematic illustration of a network 111 connecting a cryptographic device 103, e.g., a mobile telephone, a tablet, or a personal computer, to one or more remote servers 113. The cryptographic device 103 is operated by a user 101 who interacts with one of the servers 113 via a web browser window 105 of a web browser. In the example scenario illustrated in FIG. 1, the cryptographic device provides the cryptographic operations on behalf of the user 101, e.g., to decrypt messages, e.g., message C 115, which may correspond to a plaintext message M, and which is received from the remote server 113a. The messages may be a DRM protected content, such as a computer program or a music library. While not always used in such scenarios, deterministic random number generation is used in some protocols, for example, in challenge-response protocols in which the challenge is generated using a pseudo random generator.

While FIG. 1 provides an illustration of one scenario in which cryptography may play an important role; there are many other important uses for cryptography. Thus, the technology described herein is not limited in its application to the usage example illustrated in FIG. 1.

In one embodiment, discussed in conjunction with FIGS. 5 through 9, a cryptographic device 103 receives an encrypted random-number-generation seed value from a secure environment 701 (FIGS. 7-9) and generates an encrypted random number sequence from the encrypted seed and decrypts the result to obtain a decrypted random number sequence as if the random number sequence had been generated from the plaintext seed corresponding to the encrypted seed value.

Figure 2:
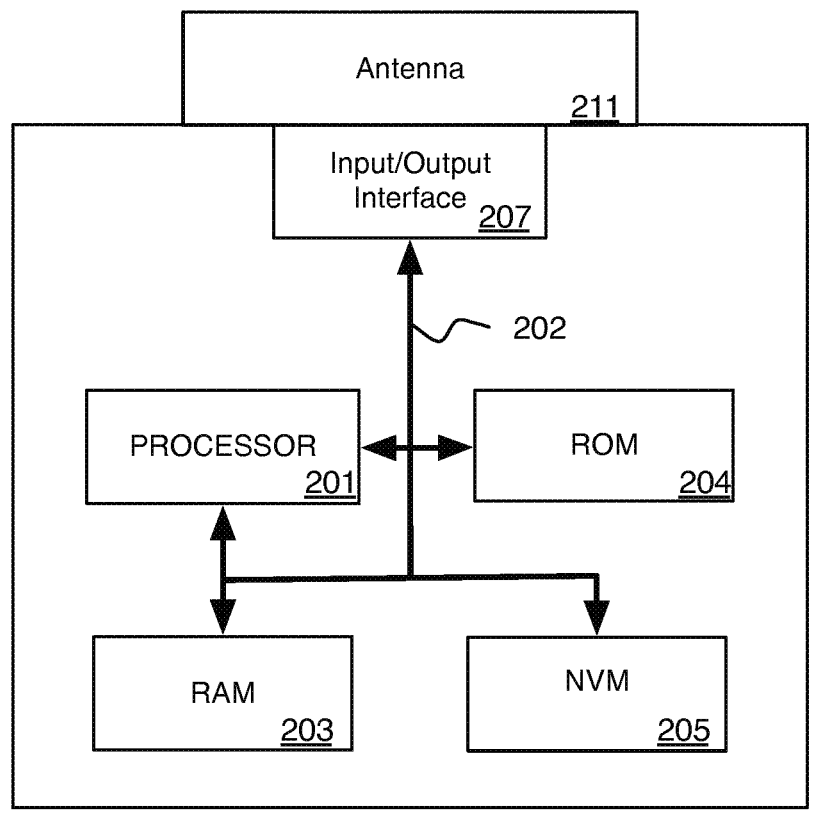
FIG. 2 is a schematic illustration of a cryptography device, e.g., a mobile device such as a mobile telephone or tablet.

FIG. 2 is a schematic illustration of a cryptography device 103, for example, a mobile telephone, tablet, or personal computer. The cryptography device 103 may include a processor 201 connected via a bus 202 to a random access memory (RAM) 203, a read-only memory (ROM) 204, and a non-volatile memory (NVM) 205. The cryptography device 103 further includes an input/output interface 207 for connecting the processor 201, again typically via the bus 202, to a connector 211 by which the cryptography device 103 may be connected to an antenna 211 by which the cryptography device 103 may connect to various forms of wireless networks, e.g., wide-area networks, WiFi networks, or mobile telephony networks. Alternatively, the cryptography device 103 may connect to networks via wired network connections such as Ethernet.

Figure 3:
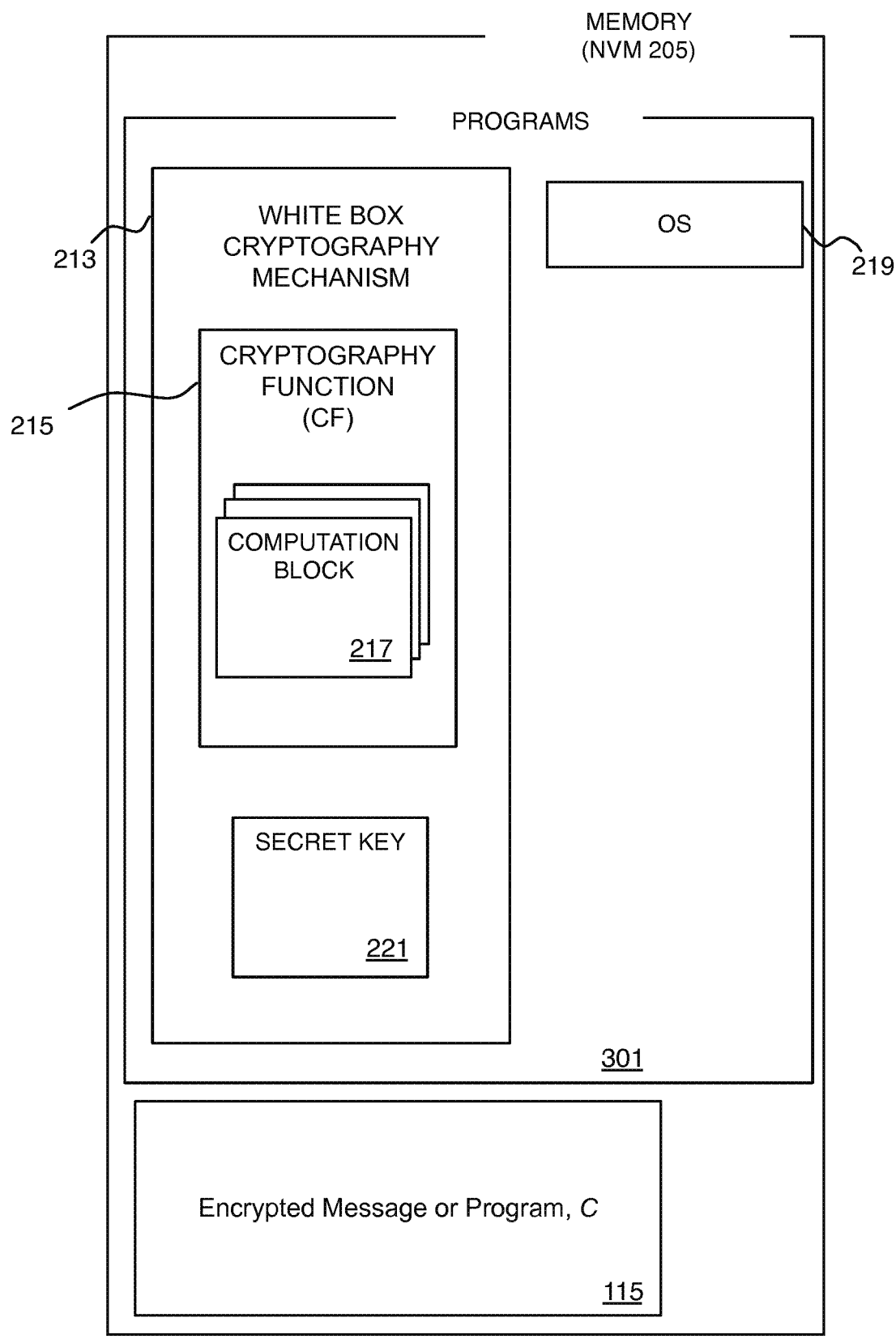
FIG. 3 is a schematic illustration of programs and data stored in a memory of the cryptography device of FIG. 2.

The ROM 204 and/or NVM 205 may include computer programs 301 as is illustrated in FIG. 3. While it is here depicted that the computer programs 301 are all co-located in the ROM 204 or the NVM 205, in actual practice there is no such restriction as programs may be spread out over multiple memories and even temporarily installed in RAM 203. Furthermore, the portable security device 109 itself may include multiple ROMs or NVMs. The programs 301 include operating system programs 219 as well as application programs loaded onto the cryptography device 103.

In a preferred embodiment, the programs include a white-box cryptography mechanism 213. While depicted in FIG. 3 as a distinct module 213, in many implementations a white-box cryptography mechanism may be implemented as a number of tables, which, for the purpose of obfuscation, may be scattered about in the memory 205. Such implementation details are outside the scope of this document.

The cryptography mechanism 213 of the cryptography device 103, implements one or more cryptography functions (CF) 215, which may be implemented as a number of computation blocks 217.

The ROM 204 or NVM 205 may also contain private data, such as a secret key 221, stored either in its basic form or in derived quantities. While in many white-box cryptography mechanisms the shared secret is stored on the cryptography device 103, in a preferred embodiment, the shared secret is not stored on the cryptography device 103. The details of the secret key 221 stored and used in conjunction with the white-box cryptography mechanism 213 is described in greater detail below.

Thus, the cryptography device 103 may receive a document, a message, or an encrypted program as the encrypted message C 115 via the connector 211. The processor 201, by executing instructions of the cryptography module 213, may decrypt the document/message using the secret key 221 according to the mechanism described herein below.

Figure 4:
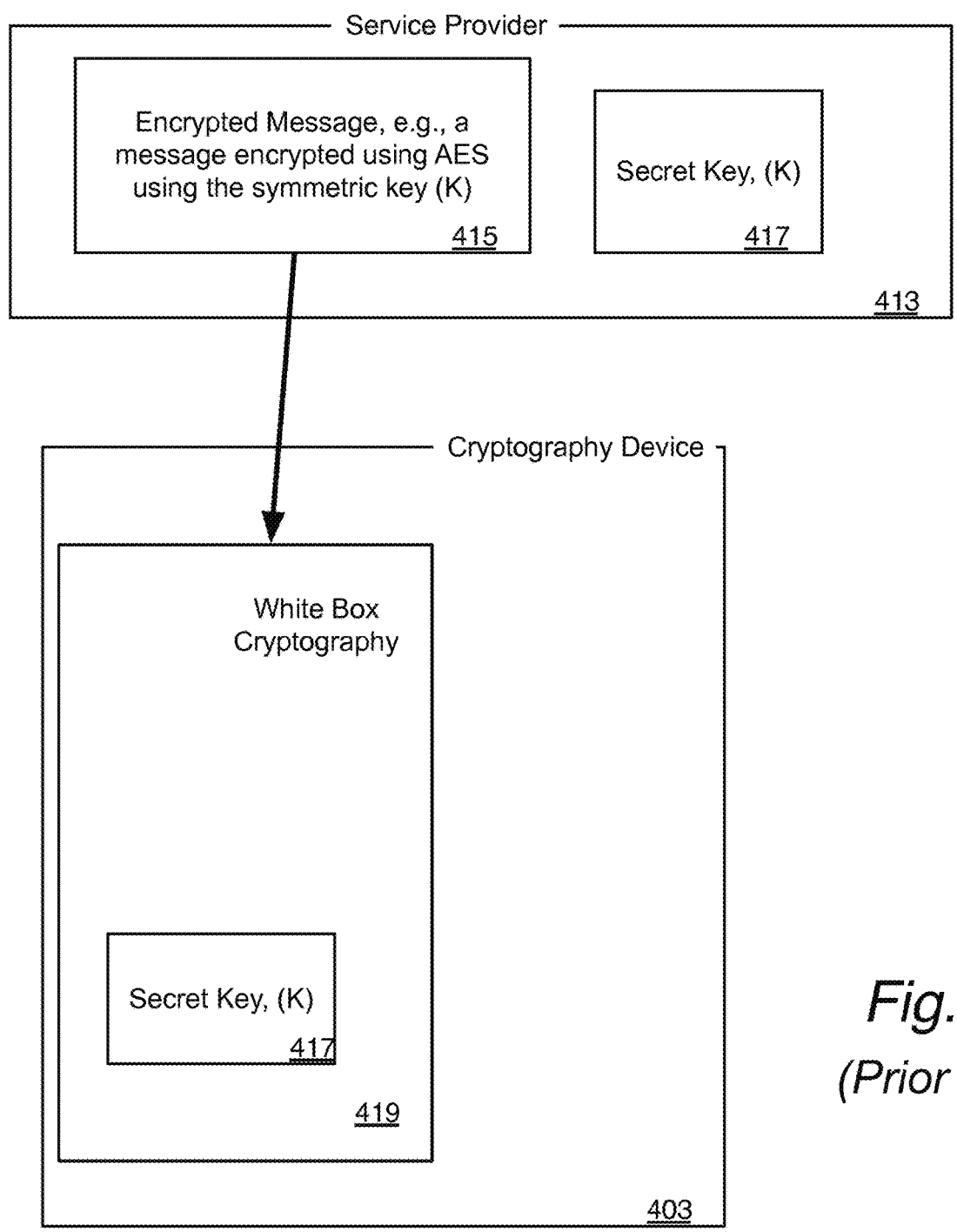
FIG. 4 is a high-level schematic illustration of a mobile device having a white-box cryptography module program listing that may be stored in the memory of a cryptography device as illustrated in FIG. 3 and which performs a cryptographic operation, e.g., an Advanced Encryption Standard (AES) decryption, to obtain access to a message obtained from a server.

FIG. 4 is a high level schematic illustration illustrating a prior art embodiment white-box cryptography mechanism. A service provider 413 (analogous to the service provider 113 of FIG. 1) may provide an encrypted message M 415 to the cryptography device 403 (analogous to device 103 of FIG. 1). The message 415 is encrypted using a key K 417 known to both the service provider 413 and the cryptography device 403. In the case of shared secret cryptography, the key K 417 is a shared secret. In the case of public key cryptography, the key 417 is a public/private key pair where the service provider 413 is possession of the public key and the cryptography device 403 is in possession of the private key.

A white-box cryptography mechanism 419 executing on the cryptography device 403 decrypts the message 415 using the shared secret 417 stored on the cryptography device 403. In a prior art white-box cryptography mechanism 419, the cryptography algorithms may be implemented as set of tables stored in memory with the shared secret 417 hidden within these tables.

Patent application entitled "Cryptography Device Having Improved Security Against Side-Channel Attacks" of the same inventors describes a mechanism for using homomorphic encryption in the context of white-box cryptography. This mechanism makes use of a deterministic random sequence to improve the security of the cryptographic processes employed therein. As the random sequence generation is one factor in providing security to the cryptography mechanism, it is important to protect the security of the random sequence generation mechanism.

Figure 5:
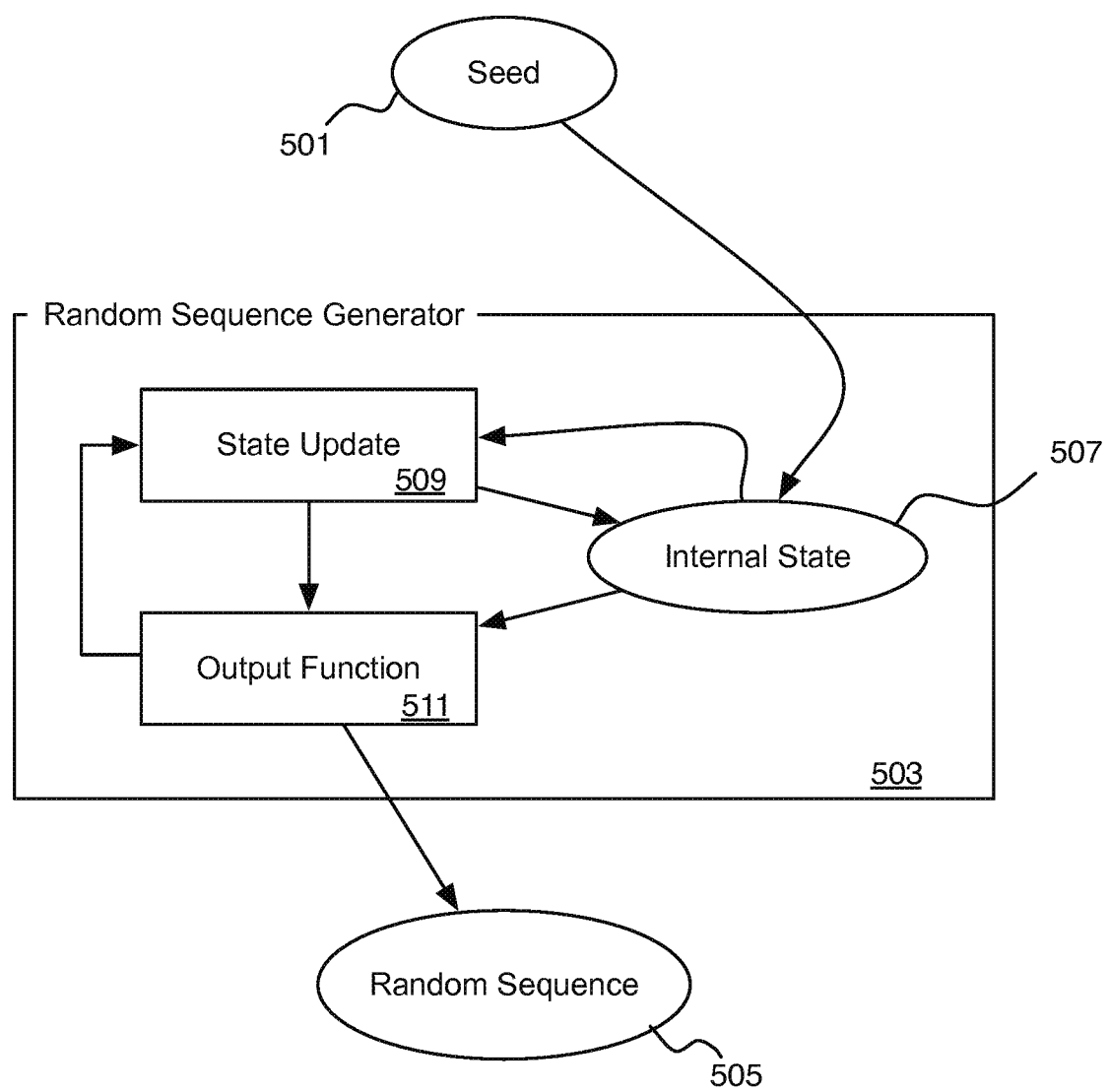
FIG. 5 is a diagram illustrating basic concept of pseudo-random sequence generation.
Figure 6:
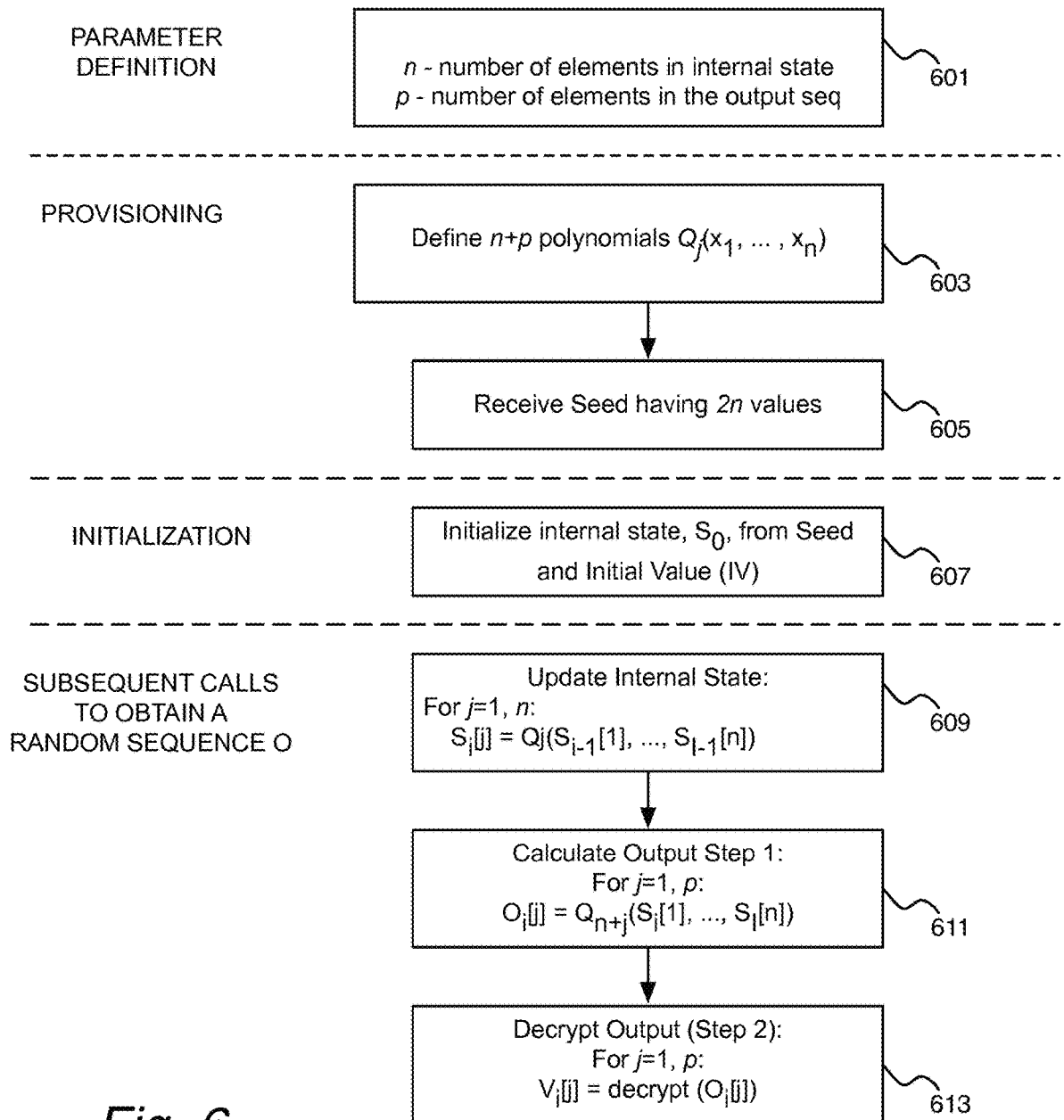
FIG. 6 is a flowchart of an exemplary deterministic pseudorandom number generator.

Pseudorandom number sequences are typically generated from a seed. FIG. 5 is a flowchart illustrating the basics of random sequence generation. The seed value 501 is input to a random sequence generator 503. The random sequence generator uses the seed value to generate one or more random sequences 505. In other words, one seed value may be used to generate multiple sequences.

One mechanism for doing so is to provide an internal state 507, which is used by an output function to compute each random sequence 505. The internal state 507 is updated by an update function 509. On each invocation of the random sequence generator 503, the update function 509 generates a new internal state. The seed 501 is used to initialize the internal state 507.

An output function 511 uses the internal state 507 to compute each random sequence 505.

Figure 7:
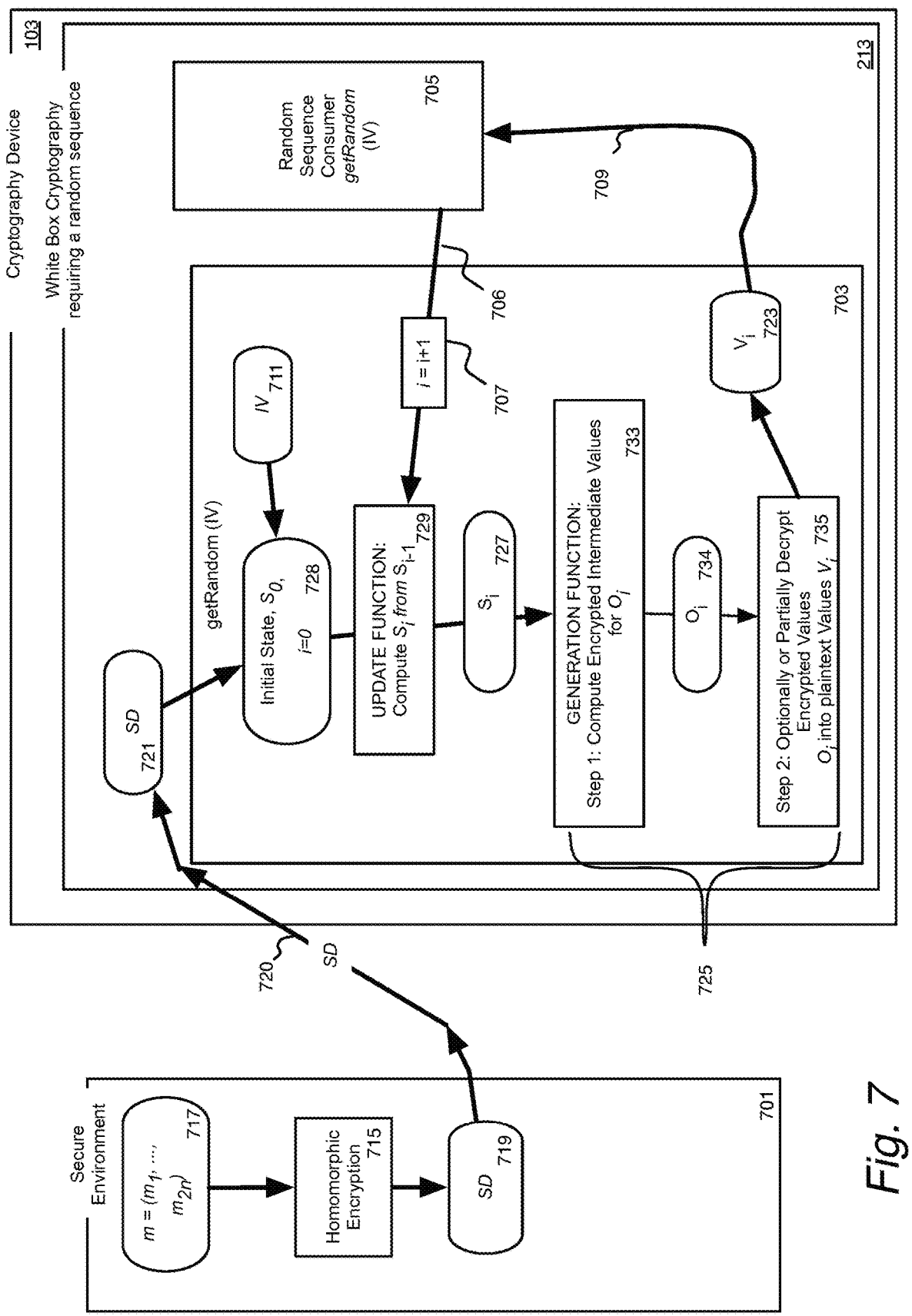
FIG. 7 is a diagram illustrating the generation of a random number sequence using n+p multivariate quadratic polynomials such that then first polynomials have quadratic monomials and no linear terms.
Figure 8:
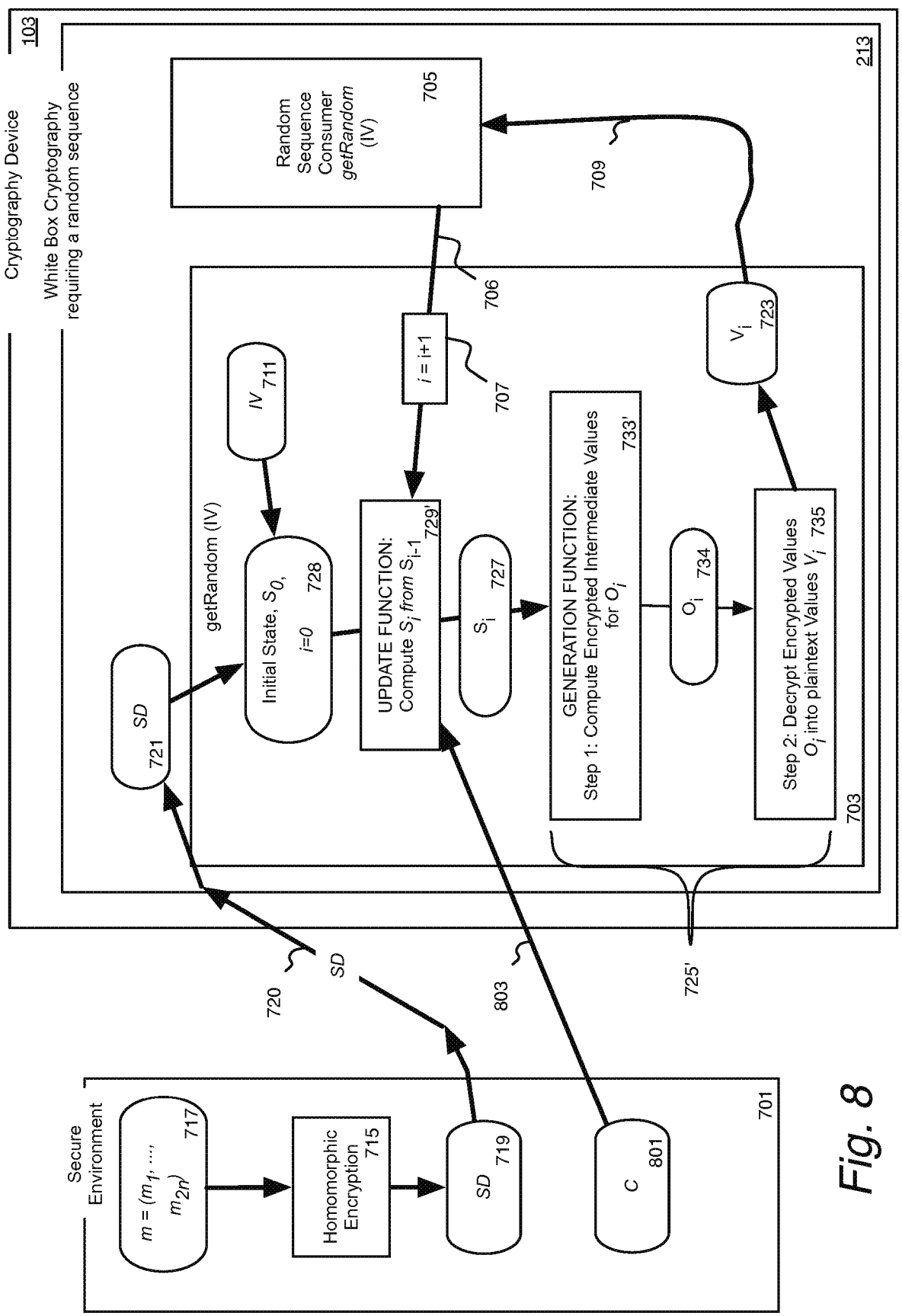
FIG. 8 is a diagram illustrating an alternative embodiment for generation of a random number sequence using n+p multivariate quadratic polynomials such that the n first polynomials are multivariate quadratic polynomials with or without linear terms.
Figure 9:
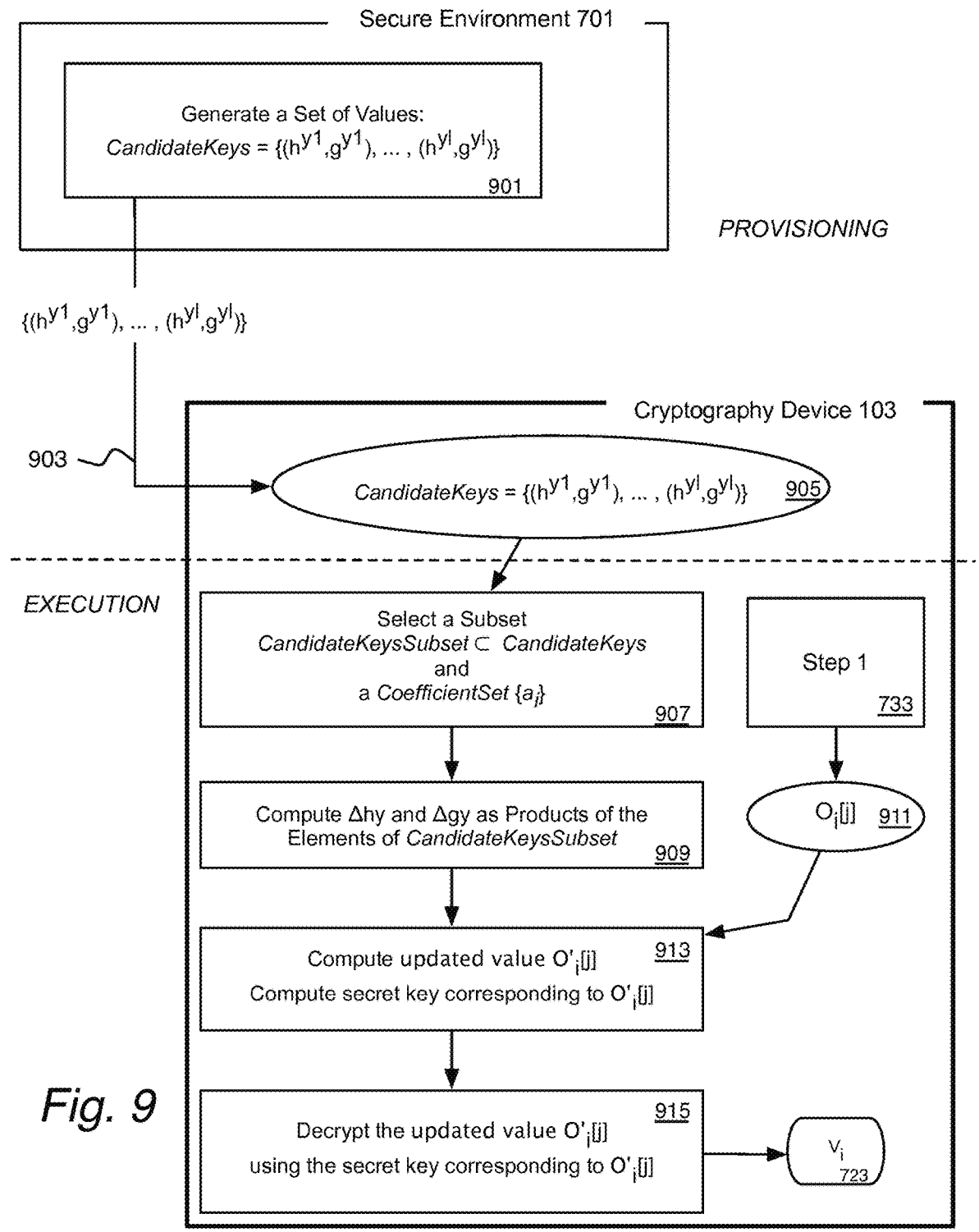
FIG. 9 is a diagram illustrating a second alternative embodiment for generation of a random number sequence.

According to embodiments—illustrated in FIG. 7, FIG. 8, and FIG. 9—the seed, the security of which is important to protecting the overall security of a cryptographic mechanism that uses random sequences, is not handled in plaintext.

Consider first, without considering cryptographic protection of the seed, an algorithm for generating a deterministic pseudorandom number sequence without consideration for protection of the seed. One such algorithm is illustrated in the flow chart of FIG. 6, which includes four phases:

Parameter definition
Provisioning
Initialization
Calls to obtain deterministic random sequence.

Parameter Definition

First, a few parameters may be defined, including n, the number of elements in the internal state, S, and the p, the number of elements in the output pseudorandom number sequence, step 601.

Provisioning

Next, in the provisioning phase, n+p multivariate polynomials $Q_j$ in n variables denoted by $Q_1(x_1, \ldots, x_n), \ldots, Q_{n+p}(x_1, \ldots, x_n) = Q_1(x), \ldots, Q_{n+p}(x)$ are defined, step 603. The polynomials Q are used to (1) update the internal state, S, and to calculate the output deterministic random sequence, O, where O is a sequence of p pseudorandom numbers. Each polynomial $Q_j$ accepts the n values of the internal state $S_i$ as input parameters.

The n first multivariate polynomials $Q_j$ are used to update the internal state (i.e., to compute $S_{i+1}$) and the p remaining multivariate polynomials are used to output a pseudorandom value, $O_i$.

While there are many possibilities for the polynomials Q, preferred embodiments include the following cases:

Case 1. (illustrated in FIG. 7) Q is an n+p multivariate quadratic polynomials such that the n first polynomials have quadratic monomials and no linear terms (and the p remaining polynomials are multivariate quadratic polynomials with or without linear terms)

Case 2. (illustrated in FIG. 8), which is a general case of Case 1, Q is an n+p multivariate quadratic polynomials such that the n first polynomials are multivariate quadratic polynomials with or without linear terms (and the p remaining polynomials are multivariate quadratic polynomials with or without linear terms)

Thus, for both Case 1 and Case 2, for the embodiments of FIG. 7 and FIG. 8, respectively, the functions $Q_1(x), \ldots, Q_n(x)$ have the form:

$$Q_k = \sum_{i,j} \lambda_{i,j} x_i x_j$$

For Case 1, the embodiment of FIG. 7, the functions $Q_{n+1}(x), \ldots, Q_p(x)$ have the form:

$$Q_k = \sum_{i,j} \lambda_{i,j} x_i x_j$$

I.e., for the embodiment of FIG. 7, all the $Q_i$ functions have the same form.

For Case 2, the embodiment of FIG. 8, the functions $Q_{n+1}(x), \ldots, Q_p(x)$ have the form:

$$Q_k = \sum_{i,j} \lambda_{i,j} x_i x_j + \sum_i \alpha_i x_i$$

The coefficients $\lambda_{i,j}$ and $\alpha_i$ are set by a provisioning server, e.g., the secure environment 701 of FIG. 7 and FIG. 8.

The embodiment of FIG. 9, key switch, may be a variant of either Case 1 or Case 2. Thus, the form of the $Q_i$ functions for that embodiments depends on whether it is a variant of Case 1 or Case 2.

Next, a seed vector having 2n values is received, step 605. In an alternative embodiment, the provisioning phase may also include provisioning the cryptographic device with any required constants. An example of the latter is illustrated in FIG. 8

As is discussed in greater detail here in below, in preferred embodiments, the seed vector is encrypted in a secure environment prior to being provisioned to a cryptographic device 103.

In preferred embodiments, the seed vector SD is encrypted using the ElGamal homomorphic encryption system, described in [Elgamal] T. Elgamal, *A public key cryptosystem and a signature scheme based on discrete logarithms*, IEEE Transactions on Information Theory (Vol. 31, Issue. 4, July 1985). Details of ElGamal encryption are provided herein below.

Being a homomorphic encryption system, ElGamal provides the mechanism of allowing computations to be performed on encrypted values such that a decryption of the computation result is the same as the performance of the same calculation on corresponding plaintext values. Consider a quantity x, which encrypted in to a value y and a function $f(x)$. If the homomorphic property holds over $f(x)$, then $f(x)$=decrypt (y). This allows computations to be performed on decrypted values with the computation result eventually obtained through a decryption operation.

Initialization of the Internal State

From the seed vector, an initial internal state, $S_0$, is initialized having n values, which are selected from the 2n values of the seed vector, step 607. Details of one embodiment for the selection process is described in conjunction with FIG. 7.

Calls to Obtain a Deterministic Random Sequence $O_i$

Internal State Update Function: When the cryptographic device 103 receives a call to calculate a new output deterministic random sequence O, the cryptographic device first updates the internal state $S_i$ applies the polynomials $Q_j$ to the previous internal state $S_{i-1}$, step 609.

Each internal state member $S_i[j]$ is set to the value:

$$S_i[j]=Q_j(S_{i-1}[1], \ldots, S_{i-n}[n])$$

Output Function, Step 1: Next, an encrypted output vector O is calculated, step 611. As discussed herein above, for state i, p output values are produced in the output sequence O. At Step 1 (the encrypted output vector), the jth output value $O_i[j]$ is determined using the n+j th polynomial Q using the current internal state ($S_i$) as inputs:

$$O_i[j]=Q_{n+j}(S_i[1], \ldots, S_i[n])$$

Output Function, Step 2: As each input value $S_i$ is a ciphertext value, the members $O_i$ of the output vector are also ciphertext. These values $O_i$ are therefore decrypted, step 613, into a plaintext result $V_i$. As discussed in greater detail below, there are several different options for performing the decryption.

FIG. 7 is an illustration of a mechanism for generating a random sequence in which a seed is provided by a secure environment 701. In an embodiment of the mechanism of FIG. 7 the seed is provided by the secure environment 701 and is not manipulated in cleartext by the cryptography device 103 thereby reducing the risk of attacks against the seed. The mechanism includes the following steps:

Encrypting seed values in a secure environment
Provisioning cryptographic device with
Encrypted seed values
Additional constants (Case 2, illustrated in FIG. 8)
Selecting initial internal state from seed value using an initial value
Updating the internal state
Generating encrypted intermediate output based on the internal state
Decrypting the encrypted intermediate output into a plaintext deterministic random sequence
Provisioning the Cryptographic Device with Seed Values In one embodiment, the secure environment 701 may be an application server that provisions the white-box enabled cryptography algorithm, e.g., a server 113 of FIG. 1. A white-box cryptography algorithm 213, e.g., an implementation of FHE protected cryptographic mechanism as described in the patent application "Cryptography Device Having Improved Security Against Side-Channel Attacks" of the same inventors, requires the use of a random sequence and provides an initial value (IV) in a call to getRandom(R), call 706.

As is described hereinbelow, the getRandom( ) function 703, selects an initial internal state ($S_0$) from an homomorphically encrypted seed value SD 721, step 713, provisioned by the secure environment 701, step 720.

The seed value SD may be generated based on some parameters. For example, one option is to use another random number generator in a secure environment to create a random value parameter. That random number generator should not be the same as pseudo random number generator of getRandom( ) 703. As discussed in greater detail hereinbelow, the seed value SD is provided in encrypted form and never used directly in plaintext on the cryptography device 103. Alternatively, the cryptographic device 103 is pre-provisioned by the secure environment 701 with the seed value SD.

In one embodiment, the encryption of the seed value vector SD relies on homomorphic encryption, e.g., ElGamal encryption or a modification thereto (as described herein below). The homomorphic encryption to generate the seed vector SD may be performed by a homomorphic encryption procedure 715.

ElGamal encryption is based on the algebraic concept of a cyclic ring G∈GF(p) of prime order q having a generator g. In preferred embodiments, p is a prime number of at least 2048 bits. Further, in preferred embodiments, the order q is a prime number of at least 200 bits.

The ElGamal secret key is $x \in Z_q^*$, i.e., in $\{1, \ldots, q-1\}$.

The corresponding public key is the value $h=g^x$, together with the cyclic ring, G, the generator, g, and the order of the ring, q.

To encrypt a value, the encrypting party selects a second value $r \in Z_q^*$, wherein r is typically a random value, and creates the ciphertext $c=(c_1, c_2)$ corresponding to a plaintext message m, by:

$$(c_1, c_2)=(g^r, m*h^r)$$

The input to the homomorphic encryption procedure 715 is a set of 2n messages, messages m=$(m_1, \ldots, m_{2n})$ 717. Each message $m_i$ is selected from $Z_q^*$.

The seed vector, SD, which the cryptographic device 103 is provisioned with by the secure environment 701, is a sequence of ciphertexts having 2n elements:

$$SD=(SD_1, SD_2, \ldots, SD_{2n})$$

where n is an arbitrary number. In practice n may not be very large; a practical upper limit for small cryptography devices may be 32.

In a preferred embodiment each message $m_i$ 717 is a static value that is randomly selected for a particular deployment of the white-box cryptography mechanism described in FIG. 7, i.e., a particular cryptographic device 103. The secure environment 701 may generate, randomly, the messages $m_i$ and link them to a particular app on a particular cryptography device 103.

The homographic encryption procedure 715 of the secure environment 701, using ElGamal encryption, creates an encrypted sequence SD 719 from the messages $m = (m_1, \ldots, m_{2n})$ 717 and the public key of the cryptographic device 103, as follows:

$$SD_1 = (g^r, m_1 * h^r)$$
$$SD_2 = (g^r, m_2 * h^r)$$
$$\ldots$$
$$SD_{2n} = (g^r, m_{2n} * h^r)$$

wherein, the ElGamal public key of the cryptographic device 103 is the tuple (h,G,g,q) as described hereinabove.

In general, the ElGamal scheme is homomorphic under multiplication, e.g., $$SD_1 * SD_2 = (g^r * g^r,\ (m_1 * h^r) * (m_2 * h^r)) = (g^{2r},\ m_1 m_2 h^{2r})$$
$$(SD_1 * SD_2) * (SD_3 * SD_4) =$$
$$(g^{2r} * g^{2r},\ (m_1 m_2 * h^{2r}) * (m_3 m_4 * h^{2r})) = (g^{4r},\ m_1 m_2 m_3 m_4 h^{4r})$$

and so on.

While the ElGamal scheme is homomorphic under multiplication, in the general case the ElGamal scheme is not homomorphic under addition. However, when the random exponent r is the same for two ciphertexts, the homomorphic property holds also for addition in some sense with respect to those two ciphertexts, e.g., the following computed value is a correct ElGamal ciphertext:

$$(g^r,(m_1 h^r)) + (g^r,(m_2 h^r)) = (g^r,(m_1+m_2)*h^r)$$

wherein, $$(g^r,(m_1+m_2)*h^r)$$

is an ElGamal ciphertext corresponding to the plaintext of the addition $m_1+m_2$. For two ciphertexts $(g^r, m_1 h^r)$ and $(g^r, m_2 h^r)$, multiplication is as follows:

$$(g^r,(m_1 h^r)) * (g^r,(m_2 h^r)) = (g^{2r},(m_1 * m_2)*h^{2r})$$

Thus, if R is the ciphertext exponent, which is updated on each operation, then for addition R=r both before and after the addition operation. However, for multiplication, R=r before the multiplication operation and R=2r after the multiplication operation.

In an alternative embodiment, a modified version of ElGamal encryption, which has similar properties to those described above, is used. In this modified version the following encodings are used:

$$SDM_1 = (h^r, m_1 * g^r)$$
$$SDM_2 = (h^r, m_2 * g^r)$$
$$\ldots$$
$$SDM_{2n} = (h^r, m_{2n} * g^r)$$

This modified ElGamal encryption scheme allows for implementing a trapdoor key that may be used at the end of the process of transferring the encrypted seed values to the cryptography device 103, referred to as SDM to differentiate from seed values encrypted using the standard ElGamal, i.e., SD.

Preferably, the value of the messages $m=(m_1, \ldots, m_{2n})$ 717 do not deliberately contain any redundancy. Rather, it is preferred that the values for the messages $m=(m_1, \ldots, m_{2n})$ 717 are selected randomly because if a value $m_i$ had some relationship to another value $m_j$, an attacker could base an attack on the knowledge of the ratio $m_i/m_j$. To further strengthen the resilience against attacks based on the ratio $m_i/m_j$, the messages $m=(m_1, \ldots, m_{2n})$ 717 may be constructed as products of a sequence of random values and a secret element k, e.g.:

$$m_i = \text{randomValue}(\ ) * k$$

The encrypted seed values SD (or SDM) 719 are transferred to the cryptography device 103, step 720. Thus, the cryptography device 103 has been provisioned with the vector $(SD=SD_1, \ldots, SD_{2n})$ 721, which corresponds to the SD vector 719.

Additional Provisioning for Case 2

In an alternative embodiment illustrated in FIG. 8 (and referred to herein as Case 2), the cryptography device 103 is provisioned with a constant vector C 801, step 803, which is used when the output generation function includes linear terms.

Selecting an Initial Internal State ($S_0$) from a Seed Value Vector and an Initial Value (IV)

To obtain a random sequence, a function, getRandom( ) 703 is called by the cryptography device 103 to generate a random sequence based on an initial value (IV). Specifically, a random sequence consumer 705 calls getRandom( ), step 706. A random sequence O is returned from getRandom( ), step 709.

The random sequence consumer 705, which may be a decryption algorithm called from a computation block 217 of the cryptography function 215 of the white-box cryptography mechanism 213, calls getRandom( ) 703 with an initial IV, step 706. IV may be computed from parameters such as time or the message being encrypted.

The value IV may be passed as an argument to the function getRandom( ) 703, alternative mechanisms may be used for providing the value IV.

The function getRandom( ) 703 is defined as a Deterministic Random Number Generator. In other words, from a specific initial value, IV, a reproducible random sequence is produced. That initial value IV is used in conjunction with a seed value, SD 721, provided externally from the cryptography device 103, e.g., from a secure environment 701.

The getRandom(IV) function 703 uses an internal state S, to (1) compute a new internal state, $S_i$, 727 by an update function 729 based on the i−1th internal state, $S_{i-1}$, and, and, (2) compute an i-th output random sequence, $O_i$ 723, using the updated internals state, $S_i$, by a generation function 725. The internal state $S_i$ is composed of n ciphertexts, $S_i=(S_i[1], \ldots, S_i[n])$. The index i is incremented each time a new output sequence $O_i$ is produced, e.g., on subsequent calls to the function getRandom( ) 703.

The seed values SD (or SDM) 721 are used by the getRandom(IV) function 703 of the cryptography device 103 together with the initial value (IV) 711 to compute an initial internal state, $S_0$ 728, i.e., ($S_0[1], \ldots, S_0[n]$). The initial state 728 is selected from the 2n SD (or SDM) 721 ciphertexts, using the initial value (IV) 711 by:

$$S_0=(S_0[1], \ldots, S_0[n])$$

$$S_0=(S_0[1]=SD_{1+IV_1*n}, \ldots, S_0[n]=SD_{n+IV_n*n})$$

($SDM_i$ substituted for $SD_i$ in alternative embodiments using the modified ElGamal scheme).

As there are $2^n$ possible values for IV, there are $2^n$ possible initial values for the initial state, $S_0$.

Update of Internal State, $S_i$

Upon each call the getRandom( ) 703, the index counter i for the internal state $S_i$ is incremented, step 707. Thus, on the first call, the internal state is $S_1$. The index counter is reset when a new initial internal state $S_0$ is selected from the SD 721 values, i.e., i is set to 0, step 728.

As discussed herein above, the update function 729 and generation function 725 are formed by n+p multivariate polynomials in n variables denoted by $Q_1(x_1, \ldots, x_n), \ldots, Q_{n+p}(x_1, \ldots, x_n)=Q_1(x), \ldots, Q_{n+p}(x)$. The n first multivariate polynomials are used to update the internal state (i.e., to compute $S_i$ from $S_{i-1}$) and the p remaining multivariate polynomials are used to output a pseudorandom intermediate ciphertext output value, $O_i$ 734, which subsequently optionally decrypted into a final output value $V_i$ 723.

Thus, the update function 729, updates the internal state $S_i[1], \ldots, S_i[n]$ using n polynomials $Q_i(x_1, \ldots, x_n), \ldots, Q_n(x_1, \ldots, x_n)$ of either of the forms described hereinabove, i.e., $$S_i[1] = Q_1(S_{i-1}[1] \ldots S_{i-1}[n])$$
$$\ldots$$
$$S_i[n] = Q_n(S_{i-1}[1] \ldots S_{i-1}[n])$$

Given the ElGamal encryption scheme in which an encryption is in the form ($g^r, m*h^r$), wherein the random value r was kept constant over the computation of all the seed value ciphertexts $SD_i$, the application of the update polynomials $Q_i$ changes the value r from one state $S_i$ to the next state $S_{i+1}$. Specifically, for the two first update polynomial alternatives given above (i.e., polynomials of degree 2), if for a state $S_{i-1}$ the random factor has the value r, the ElGamal random factor for state $S_i$ is 2r, whereas for the general case (polynomials of degree d), the random value changes from r to d*r.

Accordingly, the update function 729 tracks the value r for each new internal state $S_i$.

Output Generation Function 725—Step One 733: Compute Intermediate Ciphertext Output Values, O The output generation function 725 is composed of two steps: Step One 733, to compute intermediate ciphertext output values, $O_i$, 734 corresponding to the ultimate plaintext output values, $V_i$ 723, and Step Two 735: to optionally or partially decrypt the intermediate ciphertext output values $O_i$ into the plaintext values $V_i$. Step One 733 uses the internal state $S_i$, which is output from the update function 729, to compute the next pseudorandom ciphertext intermediate output value $O_i$ 734, where $O_i$ is a vector of output values; $O_i=(O_i[1], \ldots, O_i[p])$.

Case 1—Monomials of Degree 2 (Illustrated in FIG. 7)
For Case 1, the first output, $O_1$, has the form:

$$O_1=(O_1[1]=(g^{2^2r}, m'_{1,1} \cdot g^{2^2r}) \text{ where}, m'_{1,1}=Q_{n+1}(S_1[1], \ldots, S_1[n])$$

$$\ldots$$

$$O_1[p]=(g^{2^2r}, m'_{p,1} \cdot g^{2^2r}) \text{ where}, m'_1[p]=Q_{n+p}(S_1[1], \ldots, S_1[n]))$$

For Case 1 (FIG. 7), the ith output, has the form:

$$O_i=(O_i[1]=(g^{2^{i+1}r}, m'_i[1] \cdot g^{2^{i+1}r}) \text{ where}, m'_i[1]=Q_{n+1}(S_i[1], \ldots, S_i[n])$$

$$\ldots$$

$$O_i[p]=(g^{2^{i+1}r}, m'_i[p] \cdot g^{2^{i+1}r}) \text{ where}, m'_i[p]=Q_{n+p}(S_i[1], \ldots, S_i[n])$$

Since the polynomials are monomials of degree 2, it is possible to evaluate the polynomials $Q_{n+1}(x_1, \ldots, x_n), \ldots, Q_{n+p}(x_1, \ldots, x_n)$ over ciphertext values while maintaining values for the value r in the output such that the outputs $O_i$, which also are ElGamal ciphertexts where $O_i$ is the c2 value in a $c=(c_1, c_2)=(g^r, m*h^r)$, have uniform values for r. In other words, at the end of the process, the value of the value r for all the output values $O_i$ have the same value r and that value r is the same as the value r for the update function 729.

The index i is the request number, i.e., an ever-increasing counter. For each request, the random r as used in the ElGamal encryption is incremented by $r_{i+i}=2*r_i$. Therefore, exponent in the ElGamal encryption becomes $2^{i+1}*r$ as in $g^{2^{i+1}r}$, $m'_i[p]*g^{2^{i+1}r}$, for example.

Case 2: Multivariate Quadratic Polynomials (Illustrated in FIG. 8)

In Case 2, the polynomials $Q_i$ used by the output generation function 733' are multivariate quadratic polynomials, e.g., for each variable there is a quadratic term and a linear term.

Consider the ElGamal encryption format:

$$c=(c_1, c_2)=(g^r, m*h^r)$$

For illustrative purposes, let's use here R in lieu of r:

$$c=(c_1, c_2)=(g^R, m*h^R)$$

The linear term of each polynomial $Q_i$ can be computed on ciphertexts. The random value R of the resulting ciphertext is the same as the random value r of the input. On the other hand, the quadratic term of every polynomial, also computed on the ciphertexts, have a random value that is twice the random r of the input and twice the value for the linear term, i.e., the exponent is 2R=2r.

Therefore, for i=n+1, . . . , n+p, we have:

$$Q_i(x_1, \ldots, x_n)=A_i(x_1, \ldots, x_n)+B_i(x_1, \ldots, x_n)$$

where $A_i$ is a polynomial with monomials of degree 2 only and $B_i$ is a linear polynomial. The partial evaluation of the polynomial $Q_j(x_1, \ldots, x_n)$ over the state $S_i$ provides two ciphered values: ($g^{2R}, A_i(S_i[1], \ldots, S_i[n])*h^{2R}$) and ($g^R, B_i(S_i[1], \ldots, S_i[n])*h^R$)

At round i+1, the value of R is expected to be $2^i r$ of the input ciphertexts $SD_i$ used to select the initial internal state $S_0$.

In an alternative embodiment, rather than computing ($g^R, B_i(S_i[1], \ldots, S_i[n])*h^R$), a slightly different value is computed. Specifically, consider the knowledge of the ciphertext value ($g^R, B_i(S_i[1], \ldots, S_i[n])*h^R$), the counter i, and a constant "ciphertext" $C_i=(g^{2^i r}, (constant_i*h^r)^{2^i})$. From those values, it is possible to compute $$(B_j(S_i[1], \ldots, S_i[n])*h^R)*((constant_i)*h^r)^{2^i}$$

then, after the conclusion of Step One 733' of the output generation step 735', for Case 2 (FIG. 8), for the first generation of an intermediate ciphertext output vector, i=1:

$$O_1[1] = (g^{2^2 r}, m'_1[1] * g^{2^2 r}) \text{ where } m'_1[1] =$$
$$A_{n+1}(S_1[1], \ldots, S_1[n]) + B_{n+1}(S_1[1], \ldots, S_1[n]) * constant_1$$
$$\ldots$$
$$O_1[p] = (g^{2^2 r}, m'_1[p] * g^{2^2 r}) \text{ where } m'_1[p] =$$
$$A_{n+p}(S_1[1], \ldots, S_1[n]) + B_{n+p}(S_1[1], \ldots, S_1[n]) * constant_1$$

For Case 2, For an update i, output values are as follows:

$$O_i[1] = (g^{2^{i+1} r}, m'_1[1] * g^{2^{i+1} r}) \text{ where } m'_i[1] =$$
$$A_{n+1}(S_i[1], \ldots, S_i[n]) + B_{n+1}(S_i[1], \ldots, S_i[n]) * constant_i$$
$$\ldots$$
$$O_i[p] = (g^{2^{i+1} r}, m'_1[p] * g^{2^{i+1} r}) \text{ where } m'_1[p] =$$
$$A_{n+p}(S_i[1], \ldots, S_i[n]) + B_{n+p}(S_i[1], \ldots, S_i[n]) * constant_i$$

where, the values $constant_i$ are related to the constants $C_1, \ldots, C_n$ 801 are received by the cryptography device 103 from the server, transmission 803 (FIG. 8). In a preferred embodiment, the multiplication with the constant values $C_1, \ldots, C_2$ 801 is performed using an obfuscated function.

The above operations are on ElGamal ciphertexts. Therefore, the sequential operations track the value of the random value r used in ElGamal encryption. If we denote R as being the value of the random value r for the resulting ciphertext, the relationship between R and r is as follows:

If the homomorphic operation is multiplication:

$$(g^r, m_1 * h^r) * (g^r, m_2 * h^r) = (g^{2r}, m_1 m_2 * h^{2r})$$

Therefore, R=2r

If the homomorphic operation is addition:

$$(g^r, m_1 * h^r) * (g^r, m_2 * h^r) = (g^r, m_1 m_2 * h^r)$$

Therefore, R=r

Output Generation Function, Step Two 735: Decryption of the Output

The output of Step One 733 is computed using ElGamal encrypted values as its inputs. Therefore, the outputs $O_i$, which may be considered intermediate output values, from Step One 733 are also ElGamal ciphertexts. These outputs are optionally or partially decrypted or subjected to other processing in Step Two 735.

There are three different alternative approaches, which may be selected depending on the requirements of a particular intended use of the output:

1. The output values are decrypted within the Random Sequence Generator 703 using a Fully Homomorphic Encryption Scheme or a Somewhat Homomorphic Encryption Scheme. Of course, the decryption must match the encryption scheme used for the inputs to Step One 733.

2. The output values $O_i$ from Step One 733 are re-encrypted using a trapdoor re-encryption mechanism. Re-encryption is described herein above in conjunction with FIG. 6 in which a ciphertext encrypted using fully homomorphic encryption n is re-encrypted for a new key. Such mechanisms are described in [BBS] Blaze, M., Bleumer, G., Strauss, M.: Divertible protocols and atomic proxy cryptography. EUROCRYPT 1998 (incorporated herein by reference).

3. The value is partially decrypted using a distributed decryption mechanism.

Consider these in turn.

Case 1: Local Decryption

One possibility is to use F(S)HE (Fully (Somewhat Fully) Homomorphic Encryption) to perform the decryption step. The data does not need to be expressed in a bitwise manner since only multiplication, and addition/subtraction are needed. Then, better performances than in the general case can be achieved.

In that case, the final step is the decryption of the F(S)HE scheme which means that the decryption key has to be embedded and obfuscated in the code. A "tracer" can be used to avoid unexpected decryption (as described herein above).

Case II: Re-encryption with Alternate Key

In this embodiment, the getRandom( ) function 703 has a trapdoor key. However, the getRandom( ) function 703 does not have the key for decryption. In one embodiment, the technique of Blazer, Bleumer, and Strauss (BBS) ([Blaze] Matt Blaze, G. Bleumer, and M. Strauss. Divertible protocols and atomic proxy cryptography. In Proceedings of Eurocrypt '98, volume 1403, pages 127-144, 1998 (incorporated herein by reference)) is used to re-encrypt the output series O from one secret key to another without manipulation of the series O in plaintext.

BBS is based on the ElGamal cryptosystem and includes the notion of a "re-encryption key" $RK_{A \to B}$. Using $RK_{A \to B}$, the getRandom( ) function 703 can re-encrypt from one secret key to another without ever learning the plaintext.

G is an algebraic ring of prime order q and having a generator g.

$SK_A = a \in Z_q^*$ randomly selected.
$PK_A = g^a$
$SK_B = b \in Z_q^*$ randomly selected.
$PK_B = g^b$
$RK_{A \to B} = b/a = b * a^{-1} \mod q$
Encryption of $m \in G$ with random $r \in Z_q^*$: $c_A = (g^{ar}, m * g^r)$
Re-encryption using c and $RK_{A \to B}$:

$$C_B = ((g^{ar})^{RK_{A \to B}}, m * g^r) = \left((g^{ar})^{\frac{b}{a}}, m * g^r\right) = (g^{br}, m * g^r)$$

where m is one of the output messages $O_i[j]$.

Thus, the intermediate output values $O_i[j]$ is a ciphertext in the modified version of ElGamal wherein the seed values have been encrypted as:

$$SDM_i = (h^r, m_i * g^r)$$

Consider, the $SDM_i$, values to have been encrypted with the secret key $SK_A$, then:

$$O_i[j] = (g^{ar}, m_i[j] * g^r)$$

In an alternative embodiment, the re-encryption scheme uses the mechanism described by [AFGH] Ateniese, Fu, Green & Hohenberger, *Improved Proxy Re-Encryption Schemes with Applications to Secure Distributed Storage*, ACM Transactions on Information and System Security (TISSEC), Volume 9 Issue 1, February 2006, Pages 1-30 (incorporated herein by reference). The [AFGH] scheme is based on bilinear maps. One main advantage of the [AFGH] scheme is that the trapdoor is unidirectional whereas the trapdoor of [BB S] is bidirectional. Another advantage of the [AFGH] scheme is that it is collusion-resistant.

Case III: Distributed Decryption

There are mechanisms for distributing a decryption key x over d parties such that decryption requires the cooperation of all (or a subset) of the parties. In one example of this distributed decryption technique, to decrypt the outputs $O_i$ from Step One 733 relies on the following:

$$x = x_1 + x_2 + \ldots + x_d$$

$$h = h_1 * h_2 * \ldots * h_d = g^x = g^{x_1} * g^{x_2} * \ldots * g^{x_d}$$

$$c = (g^r, m * h^r)$$

where, c is one of the output values $O_i$.

The secret key x is defined as $x = x_1 + x_2 + \ldots x_d$ and the corresponding public key h is defined as $h = = g^x \times g^{x_1} \cdot g^{x_2} \ldots g^{x_d} = h_1 * h_2 * \ldots * h_d$ If $c = (c_1, c_2) = (g^R, h^R * m)$, one device (for example the first one) in the distributed decryption computes a partial decrypted ciphertext: $c' = (c_1, c_2/(g^R)^{x_1}) = (c_1, c/(h_1^R))$ and returns the partial result c'.

The output is c' and the corresponding secret key for c' is $x' = x_2 + \ldots x_d$. $c'' = (c'_1, c'_2/(g^R)^{x_2})$. The next decryption device computes its portion of the decryption: $c'' = (c'_1, c'_2/(g^R)^{x''})$.

The final decryption result, after all the decryption devices have performed their partial decryptions is the plaintext m.

Thus, one party, e.g., the cryptographic device 903 may request several servers to perform the partial decryptions based on those servers' respective portion of the key, respectively. After all the servers have been made to decrypt, the final result is obtained.

Case IV: Decryption with Key Switch.

In an alternative to Case I (wherein the output is decrypted within the boundary of the deterministic random number generator (in FIG. 7, the getRandom( ) function), the homomorphic encryption is replaced with a key switch option illustrated in FIG. 9.

The Provisioning phase (FIG. 6) includes an additional step of generating, in the secure environment 701, a set of candidate keys (CandidateKeys), step 901, from which a subset is selected for computing updated output values, as described below. The set of candidate keys are defined as:

$$\text{CandidateKeys} = \{(h^{y1}, g^{y1}), \ldots, (h^{yl}, g^{yl})\}$$

The CandidateKeys set is provided to the cryptography device 103, step 903, and stored thereon, 905.

During the Execution phase a subset, CandidateKeysSubset, is selected from the CandidateKeys set, step 907. The subset contains at least two elements. The cryptographic device 103 also selects a coefficient set $\{a_i\}$, one coefficient for each element in the CandidateKeysSubset.

From the CandidateKeysSubset two key switch factors, $\Delta hy$ and $\Delta gy$ are computed, step 909, as follows:

$$\Delta hy = \prod_{\substack{\text{elements } yi \text{ in} \\ \text{CandidateKeysSubset}}} (h^{yi})^{a_i}$$

$$\Delta gy = \prod_{\substack{\text{elements } yi \text{ in} \\ \text{CandidateKeysSubset}}} (g^{yi})^{a_i}$$

The output values $O_i[j]$ 911 are obtained in the same manner as illustrated in and discussed herein above in conjunction with FIG. 7, step 733 or FIG. 8, step 733' and steps that precede 733/733'. Note, the general case for $O_i[j]$ is $$O_i[p] = g^{2^{i+1}r}, m'_i[p] * h^{2^{i+1}r})$$

An updated output value $O'_i[j]$ is computed, step 913:

$$O_i[p] = g^{2^{i+1}r} * \Delta gy, m'_i[p] * h^{2^{i+1}r} * \Delta hy)$$

The corresponding secret key is:

$$\text{key} = x + \Sigma a_i y_i$$

The updated $O'_i[j]$ values are decrypted using the secret key, key, step 915, to produce the final output $V_i$.

From the foregoing, the improvement of the security of a cryptography device operating in a white box environment and storing secret material, specifically, the seed for a deterministic random number generator, is apparent. This improvement to cryptography devices is provided by enabling the cryptography devices to use homomorphic encryption to perform cryptographic operations requiring random number sequences in a manner that does not use the seed to the random number generator in a plaintext format.

The method is described herein above as using ElGamal encryption. However, in an alternative embodiment another homomorphic encryption scheme, e.g., the *Fully Homomorphic Scheme* of Gentry, as described in greater detail in Craig Gentry, *Fully Homomorphic Encryption Using Ideal Lattices*, in Proceedings of the forty-first annual ACM symposium on Theory of computing (STOC '09), pp. 169-178. ACM, 2009.

Although specific embodiments of the invention have been described and illustrated, the invention is not to be limited to the specific forms or arrangements of parts so described and illustrated. The invention is limited only by the claims.

The invention claimed is:

1. A method for operating a cryptographic device to secure computation of a deterministic random number sequence in the cryptographic device, comprising: receiving a homomorphic ciphertext seed vector (SD) wherein each element of the seed vector (SD) is encrypted from plaintext elements (m) according to a homomorphic encryption mechanism from a secure environment;

selecting an initial internal state ($S_0$) from the homomorphic ciphertext seed vector (SD) wherein the initial internal state is composed of a subset of elements selected from the homomorphic ciphertext seed vector (SD);

updating a ciphertext internal state ($S_i$), which is a vector of homomorphic ciphertext elements, from a previous ciphertext internal state ($S_{i-1}$) using update functions that are multivariate functions each accepting ciphertext elements of the previous internal state as inputs and that each produce a homomorphic ciphertext from homomorphic ciphertext input values;

generating an intermediate result vector (O) of homomorphic ciphertexts from the homomorphic ciphertext internal state ($S_i$) using output generation functions that are multivariate functions accepting the elements of the internal state as inputs and that each produce a homomorphic ciphertext from homomorphic ciphertext input values, and decrypting the homomorphic ciphertext intermediate result vector (O) elements into plaintext vector elements, thereby producing a vector (V) of plaintext elements representing deterministic random number sequence corresponding to the plaintext seed elements (m) used to produce the homomorphic ciphertext seed vector (SD, SDM).

2. The method of claim 1, wherein decrypting the homomorphic ciphertext intermediate result vector comprises partially decrypting the homomorphic ciphertext intermediate result vector (O) elements into plaintext vector elements on each of a plurality of decryption servers, combining results of the partial decryption from the plurality of decryption servers, thereby producing the vector (V) of plaintext elements representing deterministic random number sequence corresponding to the plaintext seed elements (m) used to produce the homomorphic ciphertext seed vector (SD, SDM).

3. The method of claim 1 wherein the initial internal state is selected using an initial value (IV) to determine which elements of the homomorphic ciphertext seed vector to select into the initial internal state.

4. The method of claim 3 wherein the update and generation functions are multivariate quadratic monomials without linear terms.

5. The method of claim 3 wherein the update and generation functions are multivariate quadratic polynomials with or without linear terms the method further comprising receiving constants (C) from the secure environment, wherein the method further comprises determining the linear terms from the constants (C) received from the secure environment.

6. The method of claim 3 wherein the homomorphic ciphertext of the seed vector is produced using an ElGamal encryption scheme.

7. The method of claim 6 wherein the ElGamal encryption scheme includes an exponent r defining each ciphertext value $c=(c_1, c_2)=(g^r, m*h^r)$ wherein g is a generator for a cyclic ring G, h is a public key, and m is a plaintext message corresponding to the ciphertext value c, wherein the method further comprises updating the value r for update and generation functions such that update and generation results are ciphertexts with known values for r.

8. The method of claim 3 wherein the homomorphic ciphertext of the seed vector is produced using a modified ElGamal encryption scheme.

9. The method of claim 8 wherein the modified ElGamal encryption scheme includes an exponent r defining each ciphertext value $c=(c_1, c_2)=(h_r, m*g^r)$ wherein g is a generator for a cyclic ring G, h is a public key, and m is a plaintext message corresponding to the ciphertext value c, wherein the method further comprises updating the value r for update and generation functions such that update and generation results are ciphertexts with known values for r.

10. The method of claim 3 further comprising reencrypting the homomorphic ciphertext intermediate result vector elements using an alternate public encryption key and decrypting the homomorphic ciphertext intermediate result vector elements on the cryptographic device using the corresponding secret encryption key.

11. The of claim 1 further comprising distributing a secret decryption key over a plurality of decryption servers and decrypting the homomorphic ciphertext intermediate result vector elements by iteratively decrypting the homomorphic ciphertext intermediate result vector elements on each of the plurality of decryption servers.

12. The method of claim 3 further comprising selecting a subset of candidate keys from a set of candidate key pairs, compute delta values for the secret and public keys of each selected candidate key pair, compute updated values for the homomorphic ciphertext intermediate result vector elements, computing an updated secret key corresponding to the updated values, and decrypting the updated values using the updated secret key.

13. A cryptographic device providing secure computation of a deterministic random number sequence in the cryptographic device, comprising:

a processor; and
an instruction storage connected to the processor and storing instructions executable by the processor, the instructions including instructions to cause the processor to:
receive a homomorphic ciphertext seed vector (SD) wherein each element is encrypted from plaintext elements (m) according to a homomorphic encryption mechanism from a secure environment;
select an initial internal state ($S_0$) from the homomorphic ciphertext seed vector (SD) wherein the initial internal state is composed of a subset of elements selected from the homomorphic seed vector;
update a ciphertext internal state ($S_i$), which is a vector of homomorphic ciphertext elements, from a previous ciphertext internal state ($S_{i-1}$) using update functions that are multivariate functions each accepting ciphertext elements of the previous internal state as inputs and that each produce a homomorphic ciphertext from homomorphic ciphertext input values; and
generate an intermediate result vector of homomorphic ciphertexts from the homomorphic ciphertext internal state ($S_i$) using output generation functions that are multivariate functions accepting the elements of the internal state as inputs and that each produce a homomorphic ciphertext from homomorphic ciphertext input values; and
decrypt the homomorphic ciphertext intermediate result vector (O) elements into plaintext vector elements, thereby producing a vector (V) of plaintext elements representing deterministic random number sequence corresponding to the plaintext seed elements (m) used to produce the homomorphic ciphertext seed vector (SD, SDM).

14. The cryptographic device of claim 13, the instructions to decrypt the homomorphic ciphertext intermediate result vector (O) further includes instructions to cause the processor to:
cause partial decryption of the homomorphic ciphertext intermediate result vector (O) elements into plaintext vector elements on each of a plurality of decryption servers, combine results of the partial decryption from the plurality of decryption servers, thereby producing the vector (V) of plaintext elements representing deterministic random number sequence corresponding to plaintext seed elements (m) used to produce the homomorphic ciphertext seed vector (SD, SDM).

15. The cryptographic device of claim 13, wherein the initial internal state is selected using an initial value (IV) to determine which elements of the homomorphic ciphertext seed vector to select into the initial internal state.

16. The cryptographic device of claim 13, wherein the update and generation functions are multivariate quadratic monomials without linear terms.

17. The cryptographic device of claim 13, wherein the update and generation functions are multivariate quadratic polynomials with or without linear terms the method further comprising receiving constants (C) from the secure environment, wherein the method further comprises determining the linear terms from the constants (C) received from the secure environment.

18. The cryptographic device of claim 13, wherein the homomorphic ciphertext of the seed vector is produced using an ElGamal encryption scheme.

19. The cryptographic device of claim 13, wherein the ElGamal encryption scheme includes an exponent r defining each ciphertext value $c=(c_1, c_2)=(g^r, m*h^r)$ wherein g is a generator for a cyclic ring G, h is a public key, and m is a plaintext message corresponding to the ciphertext value c, wherein the method further comprises updating the value r for update and generation functions such that update and generation results are ciphertexts with known values for r.

20. The cryptographic device of claim 13, wherein the homomorphic ciphertext of the seed vector is produced using a modified ElGamal encryption scheme.

21. The cryptographic device of claim 20, wherein the modified ElGamal encryption scheme includes an exponent r defining each ciphertext value $c=(c_1, c_2)=(h^r, m*g^r)$ wherein g is a generator for a cyclic ring G, h is a public key, and m is a plaintext message corresponding to the ciphertext value c, wherein the method further comprises updating the value r for update and generation functions such that update and generation results are ciphertexts with known values for r.

22. The cryptographic device of claim 13, the instructions further includes instructions to cause the processor to perform the step of:
    reencrypting the homomorphic ciphertext intermediate result vector elements using an alternate public encryption key and decrypting the homomorphic ciphertext intermediate result vector elements on the cryptographic device using the corresponding secret encryption key.

23. The cryptographic device of claim 13, the instructions further includes instructions to cause the processor to perform the step of:
    distributing a secret decryption key over a plurality of decryption servers and decrypting the homomorphic ciphertext intermediate result vector elements by iteratively decrypting the homomorphic ciphertext intermediate result vector elements on each of the plurality of decryption servers.

24. The cryptographic device of claim 13, the instructions further includes instructions to cause the processor to perform the step of:
    selecting a subset of candidate keys from a set of candidate key pairs, compute delta values for the secret and public keys of each selected candidate key pair, compute updated values for the homomorphic ciphertext intermediate result vector elements, computing an updated secret key corresponding to the updated values, and decrypting the updated values using the updated secret key.

* * * * *